(12) United States Patent
Suzuki et al.

(10) Patent No.: US 8,108,942 B2
(45) Date of Patent: *Jan. 31, 2012

(54) PROBE MICROSCOPE

(75) Inventors: Yoshimasa Suzuki, Tsukuba (JP);
Kazuhiko Kawasaki, Tsukuba (JP);
Satoshi Koga, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 106 days.

This patent is subject to a terminal disclaimer.

(21) Appl. No.: 12/699,321

(22) Filed: Feb. 3, 2010

(65) Prior Publication Data
US 2010/0199393 A1 Aug. 5, 2010

(30) Foreign Application Priority Data
Feb. 4, 2009 (JP) ................. 2009-023556

(51) Int. Cl.
*G01N 12/16* (2006.01)
*G01Q 20/02* (2010.01)
*G01B 7/34* (2006.01)

(52) U.S. Cl. .................. 850/6; 850/1; 850/5; 250/309; 73/105; 356/609; 356/614

(58) Field of Classification Search .............. 850/1, 5, 850/6; 250/309; 73/105; 356/609, 614
See application file for complete search history.

(56) References Cited

U.S. PATENT DOCUMENTS

| | | | | | |
|---|---|---|---|---|---|
| 5,714,682 | A | * | 2/1998 | Prater et al. | 73/105 |
| 5,986,256 | A | * | 11/1999 | Yagi | 250/234 |
| 6,485,413 | B1 | * | 11/2002 | Boppart et al. | 600/160 |
| 2008/0049236 | A1 | * | 2/2008 | Iyoki et al. | 356/614 |
| 2011/0007324 | A1 | * | 1/2011 | Suzuki et al. | 356/609 |

FOREIGN PATENT DOCUMENTS

| | | |
|---|---|---|
| JP | 03-231234 | 10/1991 |
| JP | 6-160077 | 6/1994 |
| JP | 06-160077 | 6/1994 |
| JP | 2000-236422 | 8/2000 |

\* cited by examiner

*Primary Examiner* — Nikita Wells
(74) *Attorney, Agent, or Firm* — Rankin, Hill & Clark LLP

(57) ABSTRACT

A probe microscope includes a cantilever having a probe, a displacement detecting optical system, an observation optical system, an objective lens, and a parallel glass. The displacement detecting optical system includes a first light source and a light detecting element. The observation optical system includes a second light source, an image forming lens, and a camera. The objective lens is disposed between the cantilever and the first and second light sources, and is commonly used by the displacement detecting optical system and the observation optical system. The parallel glass is capable of being inserted and retracted freely between the cantilever and the objective lens to adjust a focal point of the objective lens.

5 Claims, 8 Drawing Sheets

| | | Index of Refraction for Each Wavelength | | | Dispersion Power $\Delta$ | Shift Amount $\delta f$ (mm) at f= 30mm |
|---|---|---|---|---|---|---|
| | | $n_F$ | $n_D$ | $n_C$ | | |
| Glass Material | BK7 | 1.522 | 1.517 | 1.514 | 0.015 | 0.45 |
| | LaSFN9 | 1.870 | 1.850 | 1.844 | 0.031 | 0.93 |
| | SF11 | 1.806 | 1.784 | 1.776 | 0.039 | 1.17 |

FIG. 7

PROBE MICROSCOPE

BACKGROUND OF THE INVENTION

1. Field of the Invention

The present invention relates to a probe microscope and, more specifically, to a probe microscope having an observation optical system for observing a measured object.

2. Description of the Related Art

In the related art, a probe microscope including a cantilever having a probe that comes into contact with a measured object, a displacement detecting optical system configured to detect a displacement of the cantilever, and an observation optical system for observing the measured object, and being configured to observe a surface geometry of the measured object by scanning a surface of the measured object with the probe and detecting the displacement of the cantilever, which swings according to the surface geometry of the measured object is known (for example, see Japanese Unexamined Patent Application Publication No. 6-160077).

According to the probe microscope as described above, the displacement detecting optical system includes a first light source configured to irradiate the cantilever with light and a displacement detecting unit configured to detect a displacement of the cantilever by receiving the light emitted from the first light source and reflected from the cantilever. The observation optical system includes a second light source configured to irradiate the measured object with light and an image forming lens configured to form an image of the light emitted from the second light source and reflected from the measured object to a predetermined position. An observing unit is configured to be used for observing the measured object by receiving the light imaged by the image forming lens.

The probe microscope includes the cantilever and an objective lens disposed between the first light source and the second light source. The objective lens is used commonly by the displacement detecting optical system and the observation optical system.

The objective lens is designed and arranged so as to have a focal point at a position of the cantilever in order to cause the cantilever to be irradiated with the light emitted from the first light source and to allow the light applied to the cantilever to be observed by the observing unit.

However, since the measured object is located at a position apart from the cantilever by a distance corresponding to the probe, problems are created. Since the objective lens is designed and arranged so as to observe the light applied to the cantilever by the observing unit, the measured object cannot be observed adequately by the observing unit when determining the position of measurement.

Here, arranging the measured object at a position in the proximity of the focal point of the objective lens by bringing the cantilever and the measured object in proximity to each other is contemplated. However, if the cantilever is moved when determining the position of measurement, the probe and the measured object may come into contact with each other, which may cause damage to one or both of the probe and measured object. Removing the cantilever when determining the position of measurement or the like and mounting the cantilever again after the determination of the position of measurement is also contemplated. However, removing and re-mounting the cantilever may result in undesirable displacement of the cantilever.

As a countermeasure for these problems, according to the probe microscope described in Japanese Unexamined Patent Application Publication No. 6-160077, the measured object is adequately observed by the observing unit by adjusting a distance between the image forming lens and an image-pickup device (observing unit) when observing the measured object.

FIGS. 8A-8B schematically illustrate a configuration of a probe microscope 100 in the related art.

The probe microscope 100 includes a cantilever 110 having a probe 111 that comes into contact with a measured object W, a displacement detecting optical system 120, an observation optical system 130, a half mirror 140, and an objective lens 150, so that the surface geometry of the measured object W is observed by scanning the surface of the measured object W by the probe 111 and detecting the displacement of the cantilever 110 swinging according to the surface geometry of the measured object W.

The displacement detecting optical system 120 includes the half mirror 140, and includes the first light source and a displacement detector 121 as the displacement detecting unit.

The observation optical system 130 includes the half mirror 140, and includes an incident-light lighting device (not shown) as the second light source, an image forming lens 131, and an image-pickup device 132.

The half mirror 140 has a function to reflect the light emitted from the displacement detector 121 to be applied to the cantilever 110, and guide the light reflected from the cantilever 110 to the displacement detector 121. The half mirror 140 also has a function to apply the light emitted from the incident-light lighting device to the measured object W, and guide the light reflected from the measured object W to the image forming lens 131 and the image-pickup device 132.

When irradiating the cantilever 110 with the light emitted from the displacement detector 121 and observing the light applied on the cantilever 110 by the image-pickup device 132, an optical path of the displacement detecting optical system 120 and the observation optical system 130 runs as shown in a solid line in FIG. 8A. In this case, the light reflected from the cantilever 110 forms a parallel luminous flux via the objective lens 150, and forms an image at a position of the image-pickup device 132 arranged at a focal point of the image forming lens 131. Therefore, the image-pickup device 132 is able to observe the light applied on the cantilever 110 adequately.

However, as shown in double-dashed chain lines in FIG. 8A, the light reflected from the measured object W forms a condensed luminous flux via the objective lens 150, and hence forms an image at a position different from the position of the image-pickup device 132 which is arranged at the focal point of the image forming lens 131. Therefore, the image-pickup device 132 is not able to observe the measured object W adequately.

Accordingly, according to the probe microscope 100, as shown in FIG. 8B, the measured object W is adequately observed by the image-pickup device 132 by adjusting the distance between the image forming lens 131 and the image-pickup device 132 by a distance L.

However, in the probe microscope 100 described in Japanese Unexamined Patent Application Publication No. 6-160077, a driving mechanism for driving the image-pickup device 132 along an optical axis of the image forming lens 131 is required, and hence there is a problem that the probe microscope 100 must increase in size. Also, since adequate adjustment of the distance L every time when the object to be observed by the image-pickup device 132 (the cantilever 110 and the measured object W) is required, there is a problem such that the configuration of the probe microscope 100 is complicated.

SUMMARY OF THE INVENTION

The present invention is directed toward a probe microscope that overcomes the disadvantages of the prior art probe microscopes, and in which the size of the microscope can be reduced with a simple configuration, and that allows an adequate observation of a measured object W.

A probe microscope according to the present invention includes: a cantilever having a probe that comes into contact with a measured object; a displacement detecting optical system configured to detect displacement of the cantilever; and an observation optical system configured to observe the measured object, and being configured to observe a surface geometry of the measured object by scanning a surface of the measured object with the probe and detecting the displacement of the cantilever which swings according to the surface geometry of the measured object. The displacement detecting system includes a first light source configured to irradiate the cantilever with light; a displacement detecting unit configured to detect the displacement of the cantilever by receiving the light emitted from the first light source and reflected from the cantilever. The observation optical system includes a second light source configured to irradiate the measured object with light; an image forming lens configured to form an image of the light emitted from the second light source and reflected from the measured object at a predetermined position; and an observing unit configured to observe the measured object by receiving the light formed by the image forming lens, an objective lens disposed between the cantilever and the first and second light sources and having a focal point at a position of the cantilever; and an optical path changing unit configured to change an optical path of the light emitted from the second light source and reaches the observing unit.

In this configuration, the probe microscope includes the optical path changing unit configured to change the optical path of the light being emitted from the second optical source and reaching the observing unit. That is, the optical path of the observation optical system, and hence the optical path of the observation optical system, can be changed so that the light reflected from the measured object forms an image at a position of the observing unit when observing the measured object. Therefore, the measured object can be observed adequately without driving the observing unit, so that the probe microscope can be downsized in a simple configuration.

Preferably, the optical path changing unit includes a focal point adjusting member provided so as to be capable of being inserted into and retracted from the optical path freely. The focal point adjusting member is configured to adjust the focal point of at least one of the objective lens and the image forming lens by being inserted or retracted.

In this configuration, the probe microscope is able to adjust the focal point of the objective lens by inserting and retracting the focal point adjusting unit into and out of the optical path of the observation optical system. Hence, the optical path of the observation optical system can be changed so that the light reflected from the measured object forms an image at a position of the observing unit when observing the measured object. Therefore, the present invention achieves a probe microscope having a simple configuration that can be downsized.

When the distance between the image forming lens and the observing unit, and the distance between the objective lens and the cantilever are compared, the distance between the image forming lens and the observing unit is larger. Therefore, in a case where the focal point adjusting member is provided between the image forming lens and the observing unit, the probe microscope can be manufactured easily as compared to the case where the focal point adjusting member is provided between the objective lens and the cantilever.

Preferably, the focal point adjusting member is a parallel glass having two surfaces orthogonal to an optical axis of one of the lenses.

In this configuration, the focal point can be adjusted by adjusting the index of refraction and the thickness of the parallel glass. Therefore, since the shape of the focal point adjusting member can be simplified, the probe microscope can be manufactured easily.

Preferably, the optical path changing unit causes the second light source to emit the light having a wavelength different from the first light source, and the objective lens has the focal point at the position of the cantilever for the wavelength of the light emitted from the first light source and at a position of the measured object for the wavelength of the light emitted from the second light source.

In this configuration, the optical path of the observation optical system using the chromatic aberration of the objective lens. Therefore, the measured object can be observed adequately without adding a new member, so that the probe microscope can be downsized in a simple configuration.

Preferably, a filter configured to separate the light being emitted from the first light source and reaching the displacement detecting unit and the light being emitted from the second light source and reaching the observing unit is provided.

In this configuration, since intrusion of the light emitted from the first light source into the observing unit can be restrained or limited, the contrast of an image observed by the observing unit is improved.

BRIEF DESCRIPTION OF THE DRAWINGS

These and further features of the invention will be apparent from the following description and drawings, wherein:

FIG. 7 is a chart showing a relationship among indices of refraction for respective wavelengths, dispersion powers, and shift amounts in representative three types of glass materials in the second embodiment.

DESCRIPTION OF THE PREFERRED EMBODIMENTS

Figure 1:
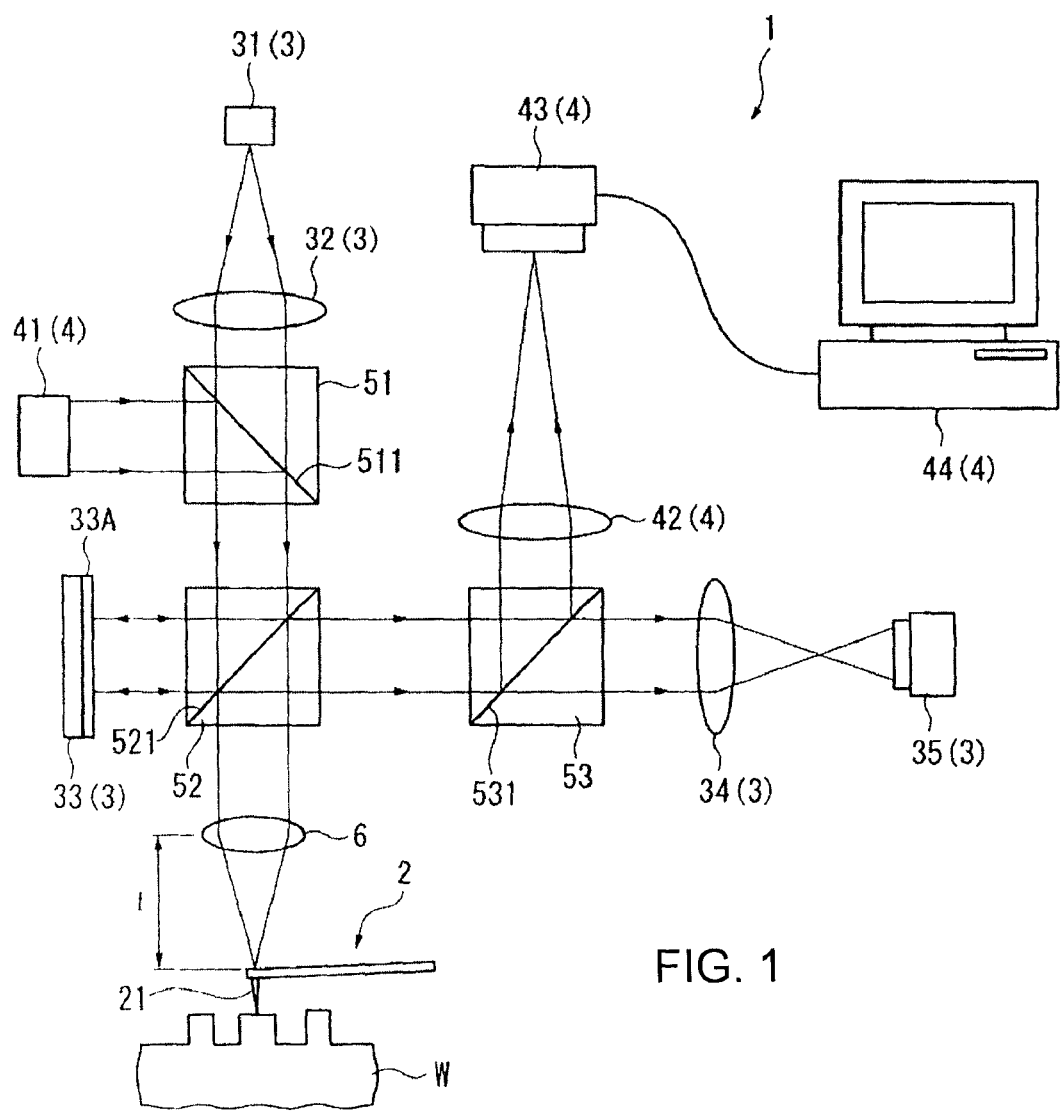
FIG. 1 is a pattern diagram showing a probe microscope according to a first embodiment of the invention.

Referring now to the drawings, a first embodiment of the invention will be described.

FIG. 1 is a pattern diagram showing a probe microscope 1 according to the first embodiment of the invention. In FIG. 1, description will be made on the assumption that the upper direction in the vertical direction is +Z axis, and two axes orthogonal to the Z-axis are an X-axis and a Y-axis, respectively. It is the same for the subsequent drawings.

As shown in FIG. 1, the probe microscope 1 includes a cantilever 2 having a probe 21, a displacement detecting optical system 3, an observation optical system 4, three beam splitters 51, 52, 53, and an objective lens 6, so that a surface geometry of a measured object W is observed by scanning a surface of the measured object W by the probe 21 and detecting a displacement of the cantilever 2 swinging according to the surface geometry of the measured object W.

The respective beam splitters 51-53 reflect part of the incoming light by interfaces 511, 521, 531 and allow other part of the incoming light to pass therethrough, and have the same function.

The displacement detecting optical system 3 is configured to detect the displacement of the cantilever 2, and includes the respective beam splitters 51-53. The displacement detecting optical system 3 includes a first light source 31 configured to irradiate the cantilever 2 with light, a collimator lens 32 configured to collimate the light emitted from the first light source 31, a reference mirror 33 arranged at a predetermined position and provided with a reference surface 33A for reflecting the incoming light, a lens 34 configured to focus the incoming light to a predetermined position, and a light detecting element 35 as a displacement detecting unit configured to detect the intensity of the light focused by the lens 34.

The observation optical system 4 is configured to observe the measured object W, and includes the respective beam splitters 51-53. The observation optical system 4 includes a second light source 41 configured to irradiate the measured object W with the light, an image forming lens 42 configured to form an image of light emitted from the second light source 41 and reflected from the measured object W at a predetermined position, a camera 43 as an observing unit configured to observe the measured object W by receiving the light formed by the image forming lens 42, and a PC (Personal Computer) 44 configured to control the camera 43.

The objective lens 6 is disposed between the cantilever 2 and the first and second light sources 31 and 41, and is commonly used by the displacement detecting optical system 3 and the observation optical system 4. The objective lens 6 is designed and arranged so as to have a focal point at the position of the cantilever 2 in order to cause the cantilever 2 to be irradiated with the light emitted from the first light source 31 and to allow the light applied on the cantilever 2 to be observed by the camera 43.

The enlargement ratio of an image to be observed by the camera 43 is determined by a relationship between a focal length f of the objective lens 6 and a focal length of the image forming lens 42. For example, assuming that the focal length f of the objective lens 6 is 10 mm, and the focal length of the image forming lens 42 is 100 mm, the enlargement ratio is 10 times (100 mm/10 mm). When the focal length f of the objective lens 6 is adjusted to the position of the cantilever 2, adjustment is performed while viewing the image to be observed via the camera 43.

An optical path of the displacement detecting optical system 3, that is, an optical path from the first light source 31 to the light detecting element 35, will now be described.

The light emitted from the first light source 31 is collimated by the collimator lens 32, and enters the beam splitter 51. Part of the light entering the beam splitter 51 passes through the interface 511 and enters the beam splitter 52. Part of the light entering the beam splitter 52 is reflected from the interface 521 toward the reference mirror 33 and other part thereof passes through the interface 521 and enters the objective lens 6. The light entering the objective lens 6 is focused on a back surface of the cantilever 2, which is located at a position of the focal point of the objective lens 6.

Light reflected from the reference surface 33A of the reference mirror 33 (hereinafter, referred to as "reference light") and light reflected from the cantilever 2 (hereinafter, referred to as "measuring light") enters the beam splitter 52. Part of the reference light entering the beam splitter 52 passes through the interface 521 and part of the measuring light entering the beam splitter 52 is reflected from the interface 521. Therefore, the reference light and the measuring light are combined into a coherent light and enter the beam splitter 53. Part of the coherent light entering the beam splitter 53 passes through the interface 531 and enters the lens 34. The coherent light entering the lens 34 is focused to a predetermined position. The coherent light focused by the lens 34 enters the light detecting element 35. The light detecting element 35 detects the coherent light focused by the lens 34 and detects the displacement of the cantilever 2 on the basis of the intensity of the detected coherent light.

An optical path of the observation optical system 4, that is, an optical path from the second light source 41 to the camera 43, will now be described.

The light emitted from the second light source 41 enters the beam splitter 51. Part of the light entering the beam splitter 51 is reflected from the interface 511 and enters the beam splitter 52. Part of the light entering the beam splitter 52 passes through the interface 521 and enters the objective lens 6. The light entering the objective lens 6 is focused on the back surface of the cantilever 2 which is located at the position of the focal point of the objective lens 6.

The light reflected from the cantilever 2 enters the beam splitter 52. Part of the light entering the beam splitter 52 is reflected from the interface 521 and enters the beam splitter 53. Part of the light entering the beam splitter 53 is reflected from the interface 531 and enters the image forming lens 42. The light entering the image forming lens 42 is focused to a predetermined position. The light focused by the image forming lens 42 enters the camera 43.

In other words, in this state, the camera 43 is focused on the back surface of the cantilever 2, and hence is able to observe the measuring light applied on the cantilever 2.

Figure 2:
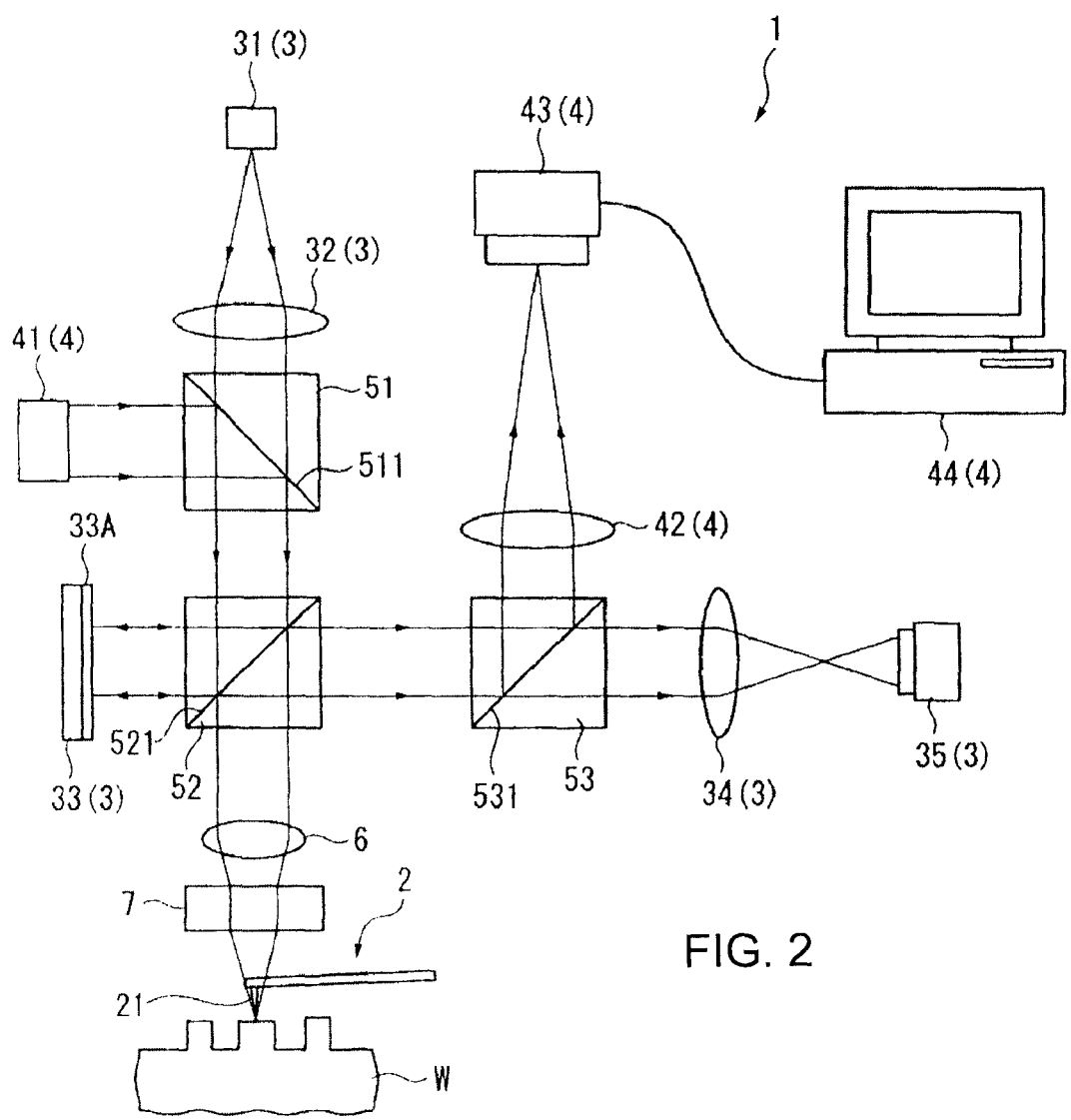
FIG. 2 is a pattern diagram showing the probe microscope in a state in which a parallel glass is inserted according to the first embodiment.

FIG. 2 is a pattern diagram showing the probe microscope 1 in a state in which the parallel glass 7 is inserted.

The probe microscope 1 includes a parallel glass 7 provided between the cantilever 2 and the objective lens 6 and served as an optical path changing unit configured to adjust the focal point of the objective lens 6, that is, the focal length f.

The parallel glass 7 as the focal point adjusting member includes two surfaces orthogonal to the optical axis of the objective lens 6, and is provided so as to be able to be inserted into and retracted from the optical axis of the observation optical system 4 freely by a driving mechanism (not shown).

Figure 3:
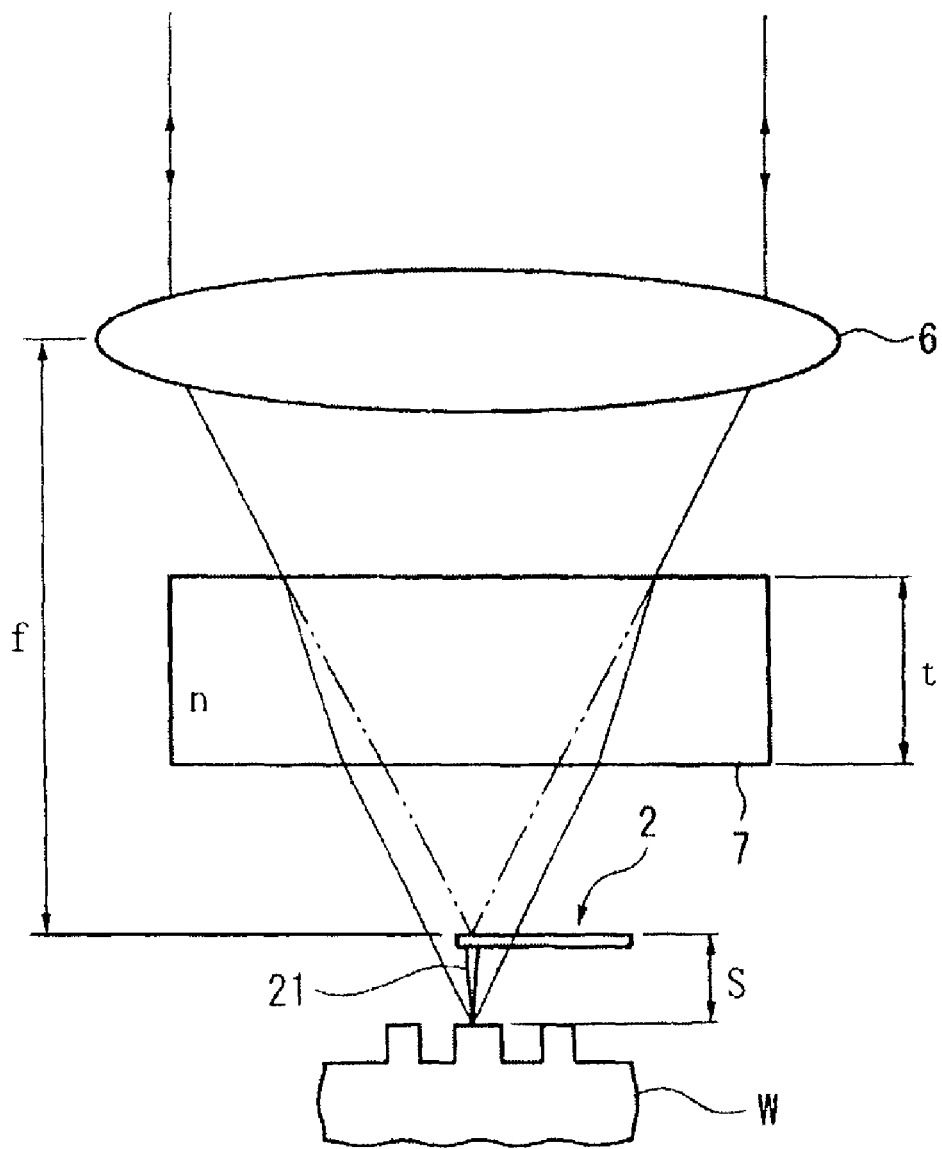
FIG. 3 is an enlarged view of a portion between a cantilever and an objective lens in the state in which the parallel glass is inserted according to the first embodiment.

FIG. 3 is an enlarged view of a portion between the cantilever 2 and the objective lens 6 in a state in which the parallel glass 7 is inserted.

When the parallel glass 7 is inserted between the cantilever 2 and the objective lens 6, the focal point of the objective lens 6 is shifted in the direction of increasing the focal length f.

Specifically, when expressing the index of refraction of the parallel glass 7 as n and the thickness thereof is expressed as t, a shift amount S of the focal point is expressed by the following expression (1).

$$S \approx t\left(1 - \frac{1}{n}\right) \quad (1)$$

Figure 4:
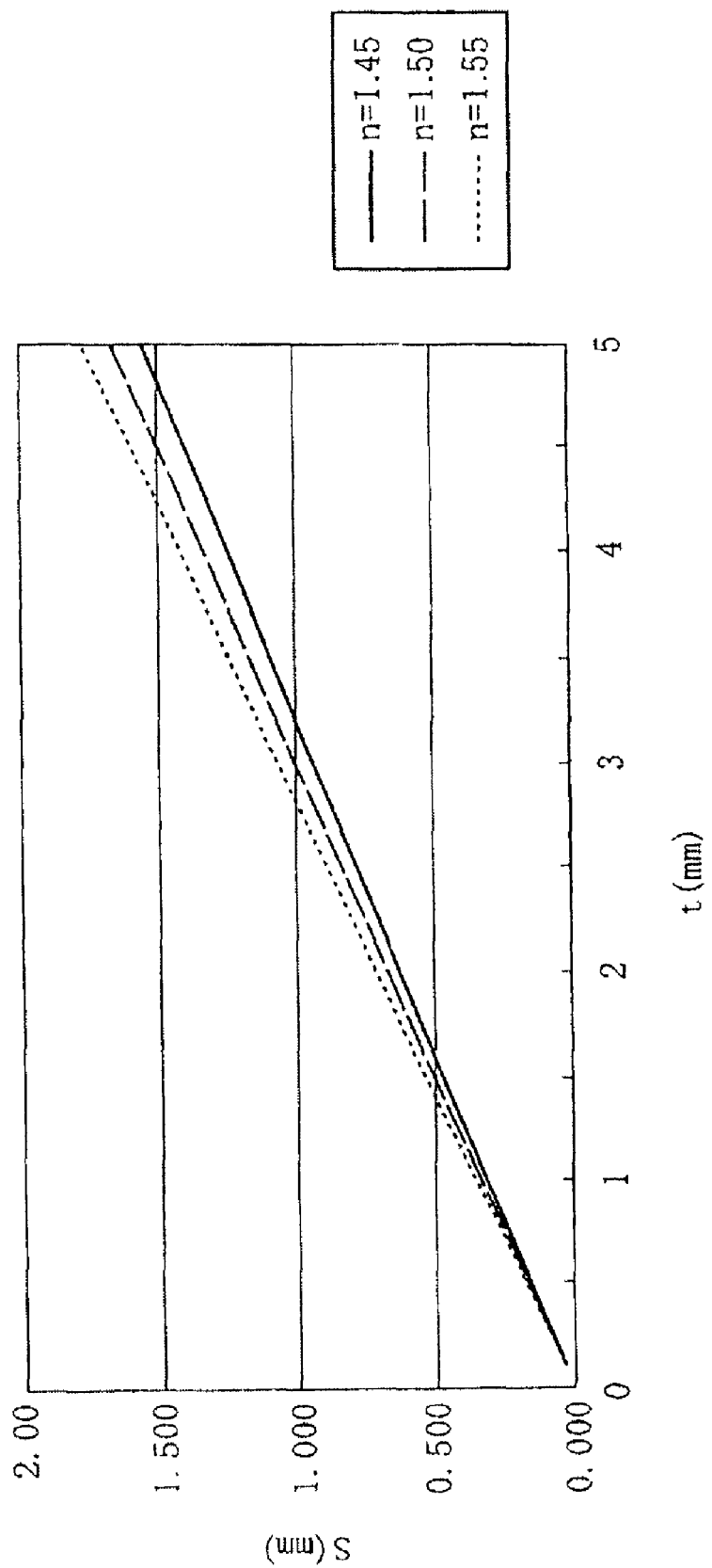
FIG. 4 is a graph showing a change of a shift amount in a case where the index of refraction and the thickness of the parallel glass are changed according to the first embodiment.

FIG. 4 is a graph showing a change of the shift amount S in a case where the index of refraction n and the thickness t of the parallel glass 7 are changed. In FIG. 4, a vertical axis represents the shift amount S and a lateral axis represents the thickness t. Graphs G1, G2, G3 show the relation between the shift amount S and the thickness t when the index of refraction n is set to 1.45, 1.50, and 1.55, respectively.

As regards the change of the shift amount S when the index of refraction n and the thickness t of the parallel glass 7 are changed, the larger the index of refraction n and the thickness t, the larger the shift amount S becomes, as shown in FIG. 4.

Therefore, on the basis of this relationship, the index of refraction n and the thickness t of the parallel glass 7 is selected so that the shift amount S is larger than a length of the probe 21.

According to the embodiment as described above, the following effects are achieved.

(1) The probe microscope 1 includes the optical path changing unit configured to change the optical path of the observation optical system 4, and hence the optical path of the observation optical system 4 can be changed so that the light reflected from the measured object W forms the image at a position of the camera 43 when observing the measured object W or the like. Therefore, the measured object W can be observed adequately without driving the camera 43, so that the probe microscope 1 can be downsized in a simple configuration.

(2) The probe microscope 1 is able to adjust the focal point of the objective lens 6 by inserting and retracting the parallel glass 7 into and from the optical path of the observation optical system 4. Hence, the optical path of the observation optical system 4 can be changed so that the light reflected by the measured object W forms the image at the position of the camera 43 when observing the measured object W or the like. Therefore, the probe microscope 1 can be downsized in a simple configuration.

(3) The probe microscope 1 is able to adjust the focal point by adjusting the index of refraction n and the thickness t of the parallel glass 7. Therefore, since the shape of the parallel glass 7 can be simplified, the probe microscope 1 can be manufactured easily.

Referring now to the drawings, a second embodiment of the invention will be described.

Figure 5:
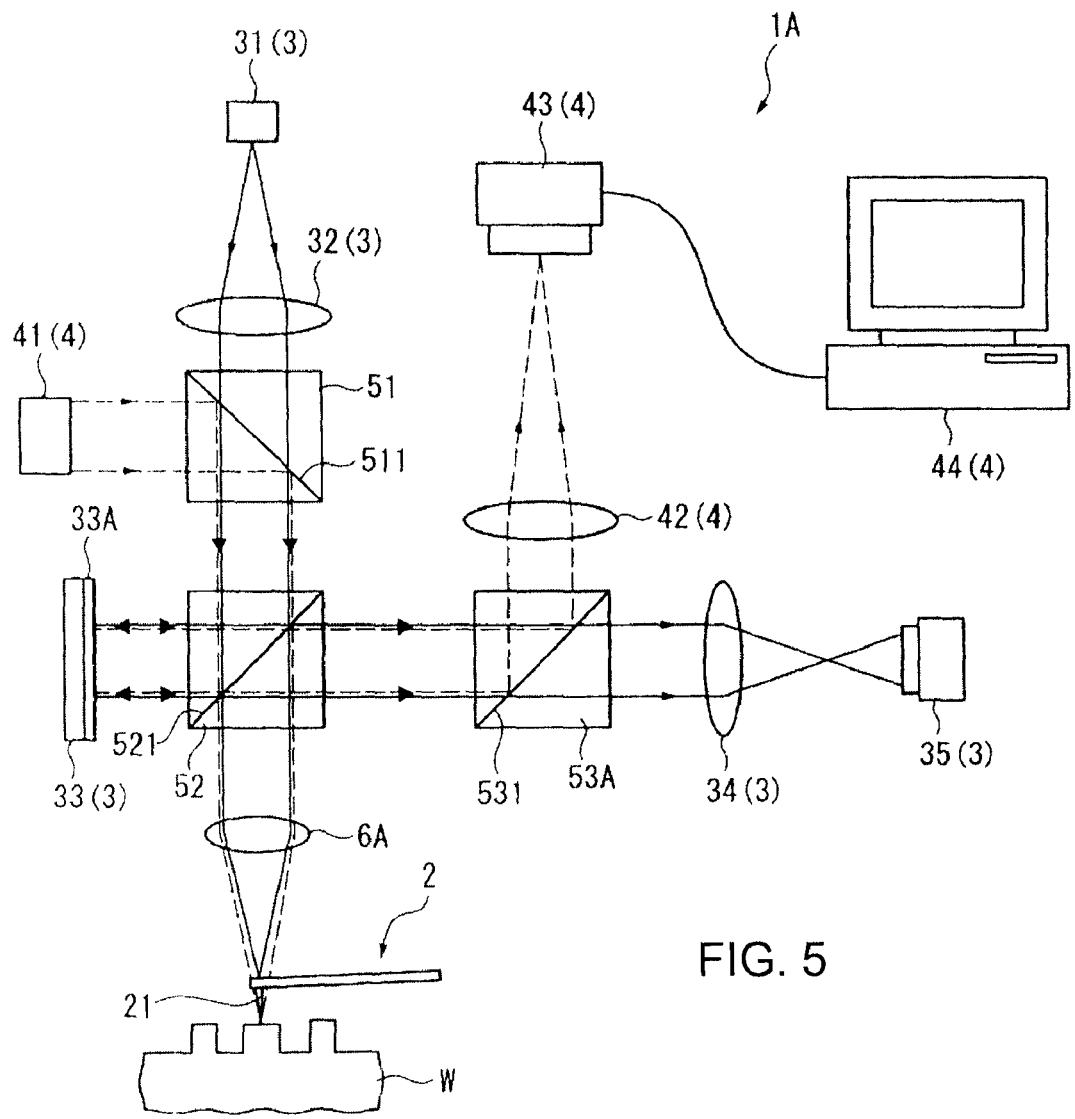
FIG. 5 is a pattern diagram showing the probe microscope according to a second embodiment.

FIG. 5 is a pattern diagram showing a probe microscope 1A according to the second embodiment of the invention. In the following description, the components already described are designated by the same reference numerals and the description will be omitted.

In the first embodiment, the optical path changing unit is the parallel glass 7. However, in the second embodiment, the optical path changing unit is provided by a second light source 41A and an objective lens 6A.

The probe microscope 1A, as shown in FIG. 5, includes the second light source 41A, the objective lens 6A, and a band-pass filter 53A as a filter configured to separate blue light, which is emitted from the first light source 31 and reaches the light detecting element 35, from red light, which is emitted from the second light source 41A and reaches the camera 43.

The second light source 41A emits light having a wavelength different from the wavelength of the light emitted from the first light source 31. In the second embodiment, the light emitted from the second light source 41A is assumed to be red light (dashed line in FIG. 5), and the light emitted from the first light source 31 is assumed to be blue light (solid line in FIG. 5) having a longer wavelength than the red light. The focal length when the red light enters the objective lens 6A is longer than the focal length when the blue light enters the objective lens 6A due to the influence of chromatic aberration of the objective lens 6A, which results when the objective lens 6A is formed of a glass material.

The objective lens 6A has a focal point at a position of the cantilever 2 for the wavelength of the light emitted from the first light source 31, (i.e., blue light) and at a position of the measured object W for the wavelength of the light emitted from the second light source 41A (i.e., red right). Here, the focal length with respect to the wavelengths of the respective colored lights is determined by the glass material used in the objective lens 6A. Hereinafter, selection of the glass material used in the objective lens 6A will be described.

Figure 6:
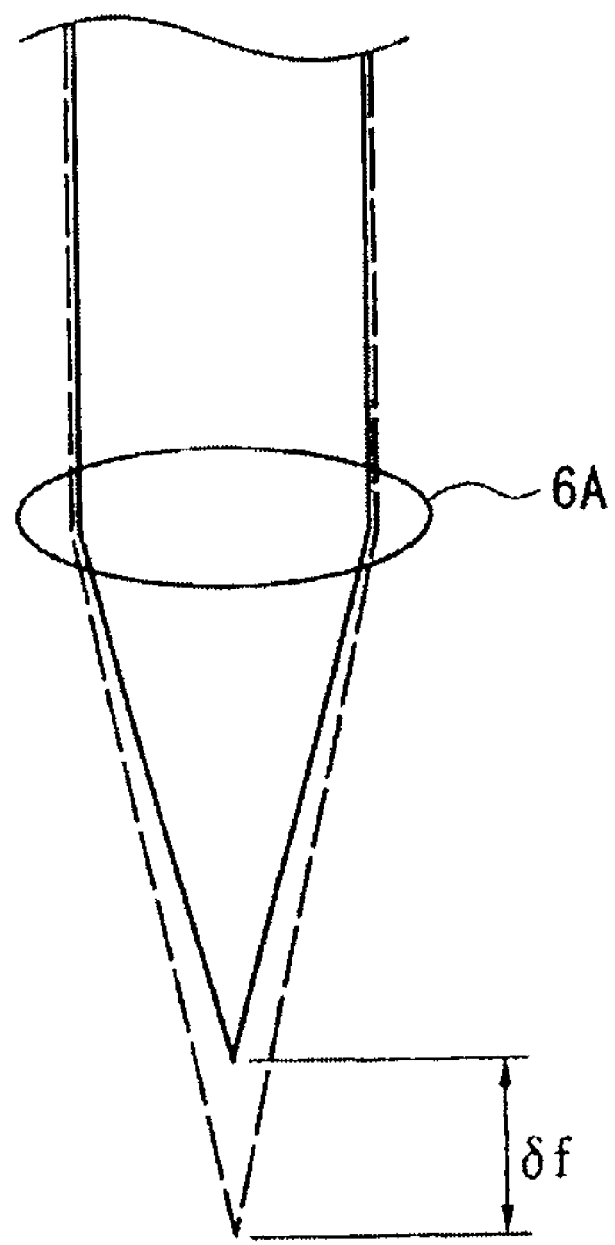
FIG. 6 is a drawing showing a relationship between a focal length when red light enters an objective lens and a focal length when blue light enters the objective lens according to the second embodiment.
Figures 8A, 8B:
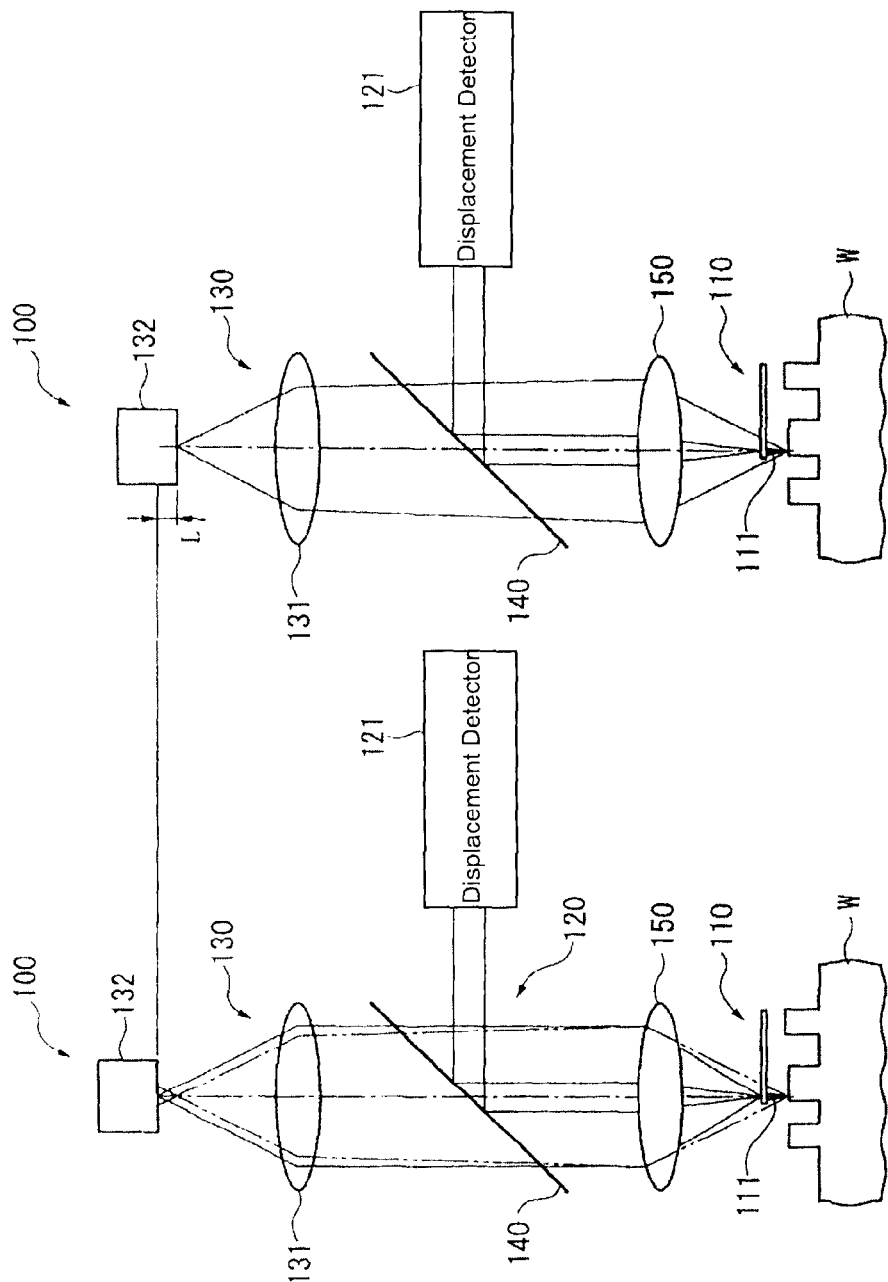
FIG. 8 is a pattern diagram showing a schematic configuration of a probe microscope in the related art.

FIG. 6 is a drawing showing a relationship between a focal length when the red light enters the objective lens 6A and a focal length when the blue light enters the objective lens 6A. In FIG. 6, the red light is indicated by a dashed line, and the blue light is indicated by a solid line.

When a shift amount between the focal distance when the red light enters the objective lens 6A and the focal distance when the blue light enters the objective lens 6A is expressed by δf as shown in FIG. 6, the shift amount δf is expressed by the following expression (2) in which $n_F$ designates an index of refraction of an F line (wavelength: 486 nm), $n_D$ designates an index of refraction of a D line (wavelength: 588 nm), and $n_C$ designates an index of refraction of a C line (wavelength: 656 nm).

$$\delta f \approx \frac{\delta n}{n-1} f = \frac{n_F - n_C}{n_D - 1} f = \Delta f \quad (2)$$

FIG. 7 is a chart showing a relationship among indices of refraction for respective wavelengths, dispersion powers Δ, and the shift amounts δf in three representative types of glass materials. In FIG. 7, the representative types of glass materials BK7, LaSFN9 and SF11 are tradenames of glass materials sold by Schott AG.

The shifting amount δf increases with increase of the dispersion power Δ as shown in FIG. 7. Therefore, on the basis of this relationship, the glass material used in the objective lens 6A is selected so that the shift amount δf becomes larger than the length of the probe 21. For example, in a case where the objective lens 6A is manufactured by a glass material SF11 having the large dispersion power Δ, and the focal length f of the objective lens 6A is 30 mm, the shift amount δf becomes 1.17 mm, so that the shift amount δF can be set to be sufficiently larger than 10 to 15 μm which is the length of the general probe 21.

In the second embodiment as describe above as well, the same effects and advantages as (1) in the first embodiment can be demonstrated, and the following effects and advantages as described below can be demonstrated.

(4) The probe microscope 1A can change the optical path of the observation optical system 4 using the chromatic aberration of the objective lens 6A. Therefore, the measured object W can be observed adequately without adding a new member, so that the probe microscope 1A can be downsized in a simple configuration.

(5) Since the probe microscope 1A is provided with the band-pass filter 53A, intrusion of light emitted from the first light source 31 into the camera 43 can be restrained, so that the contrast of the image observed by the camera 43 can be improved.

The invention is not limited to the respective embodiments described above, and modifications or improvements within the range that allows achievement of the invention are contemplated and included in the invention.

For example, the focal point adjusting member in the first embodiment is the parallel glass 7. However, for example, the focal point adjusting member may be a lens or the like.

Further, in the first embodiment, for example, the parallel glass 7 is provided between the cantilever 2 and the objective lens 6. However, the focal point adjusting member (e.g., parallel glass 7) may be provided between the image forming lens 42 and the camera 43. In a case where the focal point adjusting member is provided between the image forming lens and the observing unit, the probe microscope can be manufactured more easily as compared to the case where the focal point adjusting member is provided between the objective lens and the cantilever.

In a word, what is essential is that the focal point adjusting member is provided so as to be capable of being inserted into and retracted out of the optical path of the observation optical system freely, and the focal point of at least one of the objective lens and the image forming lens is adjusted by insertion and removal of fcal point adjusting member.

In the second embodiment, the light emitted from the second light source 41A is the red light and the light emitted from the first light source 31 is the blue light having a shorter wavelength than the red light. However, these lights may be in other colors. In a word, what is essential is that the objective lens has the focal points at the position of the cantilever for the wavelength of the light emitted from the first light source and at the position of the measured object for the wavelength of the light emitted from the second light source.

In the second embodiment, the probe microscope 1A includes the band-pass filter 53A. However, it may be a beam splitter, for example.

The invention is applicable in the probe microscope and, more specifically, is preferably applicable to a probe microscope having an observation optical system for observing a measured object.

What is claimed is:

1. A probe microscope comprising:
a cantilever having a probe that comes into contact with a measured object;
a displacement detecting optical system configured to detect a displacement of the cantilever; and
an observation optical system configured to observe the measured object, and being configured to observe a surface geometry of the measured object by scanning a surface of the measured object with the probe and detecting the displacement of the cantilever which swings according to the surface geometry of the measured object,
the displacement detecting system including:
a first light source configured to irradiate the cantilever with light; and
a displacement detecting unit configured to detect the displacement of the cantilever by receiving the light emitted from the first light source and reflected from the cantilever, and
the observation optical system including:
a second light source configured to irradiate the measured object with light;
an image forming lens configured to form an image of the light emitted from the second light source and reflected from the measured object at a predetermined position; and
an observing unit configured to observe the measured object by receiving the light formed by the image forming lens,
said probe microscope further comprising:
an objective lens disposed between the cantilever and the first and second light sources and having a focal point at a position of the cantilever; and
an optical path changing unit configured to change an optical path of the light emitted from the second light source and reaches the observing unit.

2. The probe microscope according to claim 1, wherein the optical path changing unit includes:
a focal point adjusting member provided so as to be capable of being inserted into and retracted from the optical path freely, and configured to adjust the focal point of at least one of the objective lens and the image forming lens by being inserted or retracted.

3. The probe microscope according to claim 2, wherein the focal point adjusting member is a parallel glass having two surfaces orthogonal to an optical axis of one of the lenses.

4. The probe microscope according to claim 1, wherein the optical path changing unit causes the second light source to emit the light having a wavelength different from the first light source, and
the objective lens has the focal point at the position of the cantilever for the wavelength of the light emitted from the first light source and at a position of the measured object for the wavelength of the light emitted from the second light source.

5. The probe microscope according to claim 4, including:
a filter configured to separate the light being emitted from the first light source and reaching the displacement detecting unit from the light being emitted from the second light source and reaching the observing unit.

* * * * *